(12) United States Patent
Leggio et al.

(10) Patent No.: US 7,235,111 B2
(45) Date of Patent: Jun. 26, 2007

(54) POLYCONDENSATES AS DYEING PROMOTERS FOR HYDROPHOBIC POLYMER ARTICLES

(75) Inventors: Andrew J. Leggio, Franklin Square, NY (US); Mervin G. Wood, Mobile, AL (US); Joseph Suhadolnik, Yorktown Heights, NY (US); John J. McNamara, Putnam Valley, NY (US); Ying Dong, Tarrytown, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 290 days.

(21) Appl. No.: 10/887,201

(22) Filed: Jul. 8, 2004

(65) Prior Publication Data

US 2005/0005372 A1    Jan. 13, 2005

Related U.S. Application Data

(60) Provisional application No. 60/486,067, filed on Jul. 10, 2003.

(51) Int. Cl.
*D06P 3/79* (2006.01)
(52) U.S. Cl. ............................... 8/557; 8/513
(58) Field of Classification Search ............ 8/495, 8/513, 557
See application file for complete search history.

(56) References Cited

U.S. PATENT DOCUMENTS

| | | | | |
|---|---|---|---|---|
| 3,487,453 A * | 12/1969 | Sheehan | ........................ | 8/539 |
| 4,503,111 A | 3/1985 | Jaeger et al. | ................ | 428/195 |
| 4,575,465 A | 3/1986 | Viola | ........................ | 427/261 |
| 4,935,307 A | 6/1990 | Iqbal et al. | ................ | 428/500 |
| 5,206,071 A | 4/1993 | Atherton et al. | ............ | 428/195 |
| 6,096,826 A | 8/2000 | Rabasco et al. | ............... | 525/61 |
| 6,127,037 A | 10/2000 | Sargeant et al. | ......... | 428/411.1 |
| 6,534,157 B1 | 3/2003 | Baker et al. | ................. | 428/195 |
| 2002/0002242 A1 | 1/2002 | McNamara et al. | ........ | 525/107 |
| 2004/0002570 A1 * | 1/2004 | Parrinello et al. | .......... | 524/507 |

FOREIGN PATENT DOCUMENTS

| | | | |
|---|---|---|---|
| EP | 0869010 | | 10/1998 |
| JP | 2000-272233 | | 10/2000 |
| WO | 01/74946 | | 10/2001 |
| WO | 02/45971 | * | 6/2002 |
| WO | 02/092668 | * | 11/2002 |
| WO | 03/037641 | | 5/2003 |
| WO | 03/097740 | | 11/2003 |

OTHER PUBLICATIONS

Malmstrom et al. Relaxation processes in hyperbranched polyesters. Polymer Bulletin 1994, 32 No. 5/6, 679-685.*
Jang et al. Crystallization behavior of poly(ethylene terephtalate) blended with hyperbranched polymers: The effect of terminal groups and composition of hyperbranched polymers. Macromolecules 2000, 33, 1864-1870.*
J. Jang et al., Macromolecules, (2002), vol. 33, pp. 1864-1870.
E. Malmström et al., Polymer Bulletin, vol. 32, pp. 679-685, (1994).

* cited by examiner

*Primary Examiner*—Lorna M. Douyon
*Assistant Examiner*—Amina Khan
(74) *Attorney, Agent, or Firm*—Tyler A. Stevenson

(57) ABSTRACT

A process for dyeing or printing an article comprising a hydrophobic polymer, wherein the hydrophobic polymer is brought into contact with a condensation polymer obtained by condensation of at least one poly-hydroxyl-mono-carboxylic acid, prior to or simultaneously with the treatment of the article with a color imparting compound, with the proviso that the condensation polymer is not terminated with lipophilic groups. The process provides dyed articles with good fastness properties.

9 Claims, No Drawings

POLYCONDENSATES AS DYEING PROMOTERS FOR HYDROPHOBIC POLYMER ARTICLES

This application claims priority under 35 USC 119(e) of U.S. provisional application No. 60/486,067, filed Jul. 10, 2003.

The present invention relates to processes for dyeing or printing of hydrophobic polymer articles, such as fibers, using condensation polymers as dyeing promoters, to compositions containing these condensation polymers and to processes for the preparation of these condensation polymers.

Dyeing promoters or dyeing accelerants are used to achieve improved dye penetration of hydrophobic polymer materials, such as polyester or polyolefin fibers. They are supposed to loosen the interpolymer bonds and allow penetration of dyes into the fiber.

Dyeing promoters are not needed for the dyeing of natural fibers because natural fibers have an open, partially hollow structure and are easily penetrated by dye solutions in water.

It is difficult for aqueous dye solutions to penetrate synthetic fibers which are more or less hydrophobic in nature, such as polypropylene, polyester, polyacrylics or polyamides, as compared to cellulose, a hydrophilic fiber. The rate of water imbibition is very low as compared to viscose. The reason for this low imbibition rate is supposed to be the tight fiber structure obtained when the polymer fibers are drawn in a spinneret. During the drawing operation the polymer chains become highly oriented and tightly packed, forming a structure practically free of voids.

Polyolefin or polyester polymers do not contain an ionic group and are usually dyed with disperse dyes which are nonionic in nature too. These dyes dye polyester through a diffusion mechanism. Prolonged boiling of the dyebath, for example, loosens the forces binding the polymer chains to each other causing the fiber to swell. This allows a limited penetration of the fiber surface by the dye. However, the rate of absorption or diffusion of disperse dyes in polyester is very low. This low dyeing rate is too costly to meet the economic requirements of industrial processing. In addition, deep shades are difficult to achieve and the final dyeing does not meet the minimum fastness required by commercial standards.

In order to achieve deep shades and appreciable fastness properties, dyeing of hydrophobic fiber material is carried out in the presence of dyeing promoters, such as carriers. Dye carriers have found their greatest use in the dyeing of polyester. Many theories have been advanced to explain the mechanism of carrier dyeing. However, no universal agreement exists on the mechanism of carrier dyeing.

U.S. Pat. No. 6,444,758 discloses the use of hyperbranched amphiphilic polymeric additives to improve dyeability of polypropylene fibers.

Since the available dyeing promoters do not fulfill all the requirements, for example, in terms of fastness properties of the dyed material or economic requirements of industrial dyeing, such as processing time and temperature, there is still a need for improved processes for the dyeing of hydrophobic material.

The problem underlying the present invention is accordingly to find processes for improving the affinity of hydrophobic material, such as fibers, to dyestuffs, which fulfil the criteria characterised above to a high degree.

It has now been found that certain condensation polymers obtained by condensation of at least one aliphatic poly-hydroxyl-mono-carboxylic acid are particularly effective dyeing promoters which improve the dyeability of articles comprising a hydrophobic polymer, such as polyolefin fibers.

DETAILED DISCLOSURE

Accordingly, a subject of the present invention relates to a process for dyeing or printing an article comprising a hydrophobic polymer, wherein said polymer is brought into contact with a condensation polymer obtained by condensation of at least one poly-hydroxyl-mono-carboxylic acid, prior to or simultaneously with the treatment of said article with a color imparting compound, with the proviso that the condensation polymer is not terminated with lipophilic groups.

Another subject of the present invention relates to a composition comprising
(a) a condensation polymer obtained by condensation of at least one poly-hydroxyl-mono-carboxylic acid, and
(b) a hydrophobic polymer, with the proviso that the condensation polymer is not terminated with lipophilic groups.

Still another subject of the present invention relates to a process for the preparation of an article comprising a hydrophobic polymer which shows good affinity to dyes, wherein said polymer is brought into contact with a condensation polymer obtained by condensation of at least one poly-hydroxyl-mono-carboxylic acid, with the proviso that the condensation polymer is not terminated with lipophilic groups.

The condensation polymers, subject to the inventive processes and to the inventive composition above, are described in U.S. Pat. No. 3,669,939. However, it has been found that valuable condensation polymers can be prepared as well, if the condensation reaction is carried out at somewhat higher temperatures.

Accordingly, still another subject of the present invention relates to a process for the preparation of a condensation polymer, comprising reacting at least one poly-hydroxyl-mono-carboxylic acid at a temperature of at least 200° C.

The condensation polymers are derived from at least one poly-hydroxyl-mono-carboxylic acid, which may undergo self-condensation to produce hyperbranched sections which are random and irregular and contain failure sequences.

The random condensation polymer may itself be a homopolymer or a random copolymer.

Examples of poly-hydroxyl-mono-carboxylic acids useful in the present invention include compounds that have one carboxylic acid group and at least two hydroxyl groups, such as the compounds generically described in columns 1 and 2 of U.S. Pat. No. 3,669,939, which is incorporated herein by reference.

Poly-hydroxyl-mono-carboxylic acids may be, for example, dimethylol propionic acid (2,2-bis(hydroxymethyl)propionic acid, or BMPA), α,α-bis-(hydroxymethyl)-butyric acid, α,α,α-tris(hydroxymethyl)-acetic acid, α,α-bis(hydroxymethyl)-valeric acid, α,α-bis(hydroxy)propionic acid, α-phenylcarboxylic acids having at least two hydroxyl groups directly pendant to the phenyl ring (phenolic hydroxyl groups) such as 3,5-dihydroxybenzoic acid.

The condensation polymers may be self-condensates of a single poly-hydroxyl-mono-carboxylic acid, or co-condensates of at least two different poly-hydroxyl-mono-carboxylic acids in which case highly branched polymers of high molecular weight and high hydroxyl content can be produced. The poly-hydroxyl-mono-carboxylic acids may also be co-condensed with mono-hydroxyl-mono-carboxylic acids and/or mono-amino-mono-carboxylic acids if it is desired to modify the self-condensate, for example, in respect of molecular weight, branching, hydroxyl functionality or solubility in certain solvents. Suitable mono-hydroxyl-mono-carboxylic acids include 12-hydroxy stearic acid, 12-hydroxy oleic acid and lactic acid. Suitable mono-amino-mono-carboxylic acids include glycine, 6-amino caproic acid and 11-amino undecanoic acid.

The properties, such as solubility or compatibility, may be varied by controlling the proportion and type of mono-hydroxyl-mono-carboxylic acids and/or mono-amino-mono-carboxylic acids used in the co-condensation. For example, the hydroxyl value of a self-condensate of dimethylol propionic acid can be reduced by co-condensation of dimethylol propionic acid with a certain amount of 12-hydroxy stearic acid.

Mono-hydroxyl compounds, such as butanol and decanol, or poly-hydroxyl compounds, such as pentaerythritol, may also be present in the condensation reaction.

The condensation polymers are not terminated with lipophilic groups. Compounds introducing lipophilic groups, which are excluded in the synthesis of the condensation polymers, are compounds susceptible to reaction with hydroxyl groups, such as mono- or di-carboxylic acids.

In an interesting embodiment of the present invention the poly-hydroxyl-mono-carboxylic acids are aliphatic and do not contain aromatic groups.

In another interesting embodiment of the present invention the mono-hydroxyl-mono-carboxylic acids and the mono-amino-mono-carboxylic acids are aliphatic and do not contain aromatic groups.

The dyeing promoters according to the present invention are prepared by condensation of at least one poly-hydroxyl-mono-carboxylic acid and, where required, at least one compound selected form the group mono-hydroxyl-mono-carboxylic acid, mono-amino-mono-carboxylic acid, mono-hydroxyl compound and poly-hydroxyl compound, preferably at least one poly-hydroxyl-mono-carboxylic acid and, where required, at least one compound selected form the group mono-hydroxyl-mono-carboxylic acid and mono-amino-mono-carboxylic acid, especially at least one poly-hydroxyl-mono-carboxylic acid.

The condensation polymer is especially preferred a homopolymer of a single poly-hydroxyl-mono-carboxylic acid.

As mentioned, the hyperbranched sections of the condensation polymers are random and irregular and contain failure sequences. They contain linear and fully branched repeating units. For example, a condensation polymer which is derived from dimethylol propionic acid, will comprise a mixture, among other perturbations, of the following branched and linear structures:

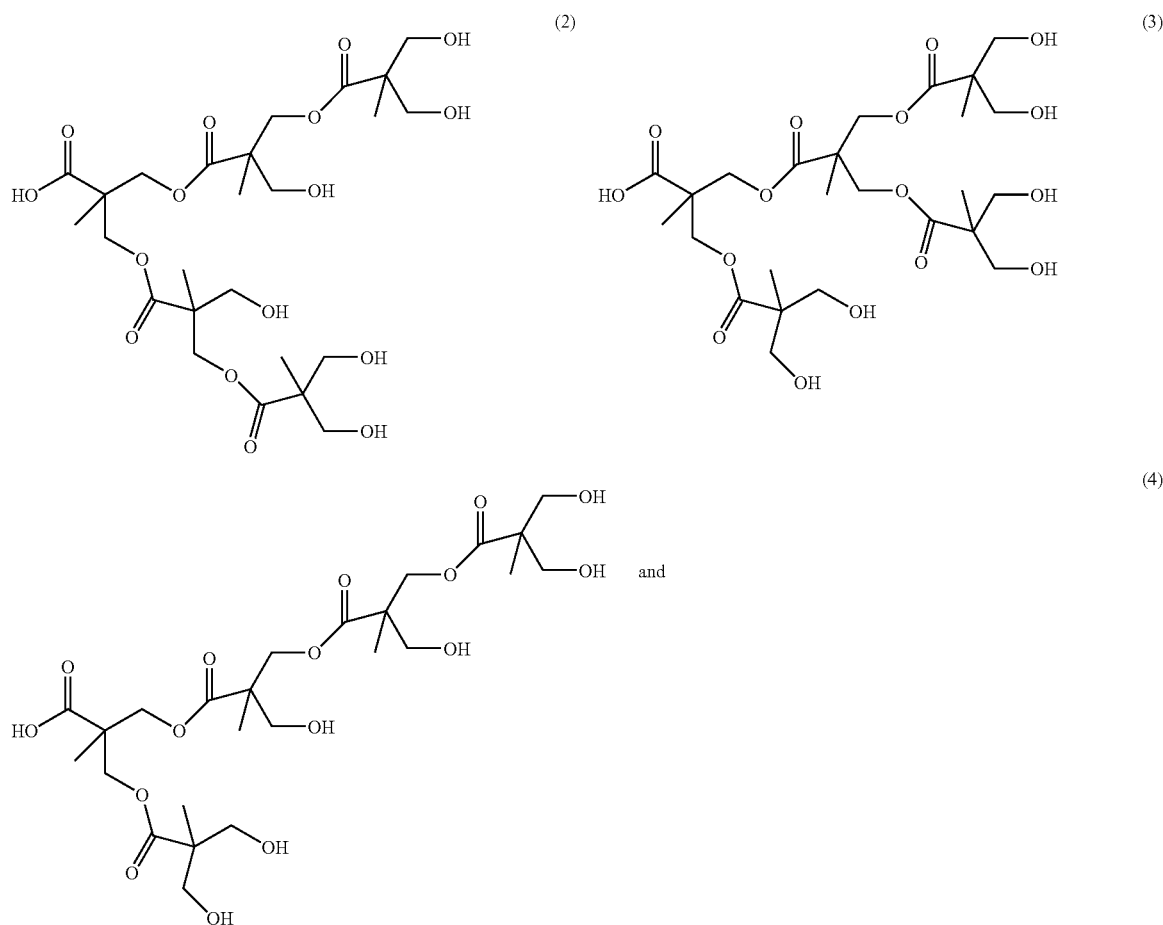

-continued

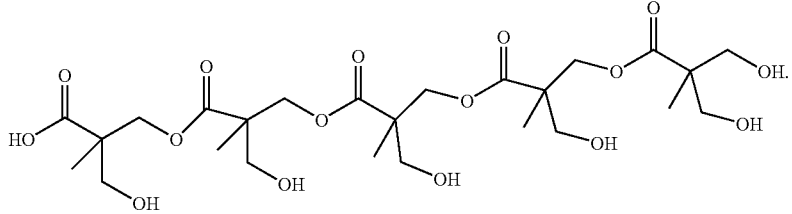

(5)

It can be seen that the condensation polymers comprise a complex random mixture of sequences which are fully branched, partially branched and linear.

Preferably the poly-hydroxyl-mono-carboxylic acids are compounds of the formula

(1)

wherein
R is $C_1$-$C_{12}$alkyl or a radical —$CH_2$—OH.

The radical R is straight-chained or branched, for example, methyl, ethyl, n-propyl, iso-propyl, n-butyl, iso-butyl, sec-butyl and tert-butyl, n-pentyl, iso-pentyl, n-hexyl, n-heptyl, n-octyl, n-nonyl, n-decyl, n-undecyl and n-dodecyl.

R is preferably $C_1$-$C_4$alkyl, especially methyl.

The condensation polymers may be prepared by conventional methods, for example, by melt polycondensation or polycondensation in the presence of solvent, of the components indicated above, the eliminated water being removed by known methods, such as azeotropic destillation, vacuum destillation, sparging with an inert gas and the like.

In a preferred preparation process, an esterification catalyst is present in the reaction mixture at a level of about 0.1 to about 2% by weight based on the entire reaction mixture. Preferably the esterification catalyst is present in the reaction mixture at a level of about 0.2 to about 1% by weight of the entire reaction mixture. The esterification catalyst may be any commonly known catalyst, for example protic acids, Lewis acids, titanates, zinc catalysts and tin catalysts.

The reactions are performed in the temperature range, for example, from about 140° C. to about 220° C. In an interesting embodiment, the process is performed in the temperature range from about 150° C. to about 190° C. In another interesting embodiment, the process is performed at a temperature of at least 200° C. In this embodiment, the upper temperature limit is, for example, 220° C., preferably 210° C. If polycondensation is carried out in the presence of solvent, a suitable high boiling solvent, for example, tetraglyme, is used.

Protic acid catalysts are, for example, naphthalenesulfonic acid, para-toluenesulfonic acid (p-TSA), methanesulfonic acid, trifluoromethanesulfonic acid, trifluoroacetic acid, sulfuric acid or phosphoric acid. A titanate catalyst is for example tetrabutyl titanate. A zinc catalyst is for example zinc powder or an organozinc compound. A tin catalyst is for example tin powder or an organotin compound, such as dibutyltin oxide.

Within the context of the present invention an article denotes casts, molds, tapes, plastic films or fibers, preferably fibers.

The fibers mentioned can exist in widely varying processing forms, for example, as yarns, woven fabrics or knitted fabrics and in the form of carpets.

The hydrophobic polymer may be, for example, polyolefin, polystyrene, polyester, polyamide, polyether, polysulfone, polycarbonate, polyurea, polyurethane and polysiloxane and any mixture of these polymers.

Preferably the hydrophobic polymer is a polyolefin.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins, especially polyethylene or polypropylene and especially preferred polypropylene.

Polystyrenes of the invention include styrene-butadiene copolymers and block copolymers, ABS, IPS and styrene-isoprene copolymers and block copolymers.

In addition to the condensation polymer additive the hydrophobic polymers may comprise further additives (stabilizers) such as, for example, the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl -4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl -4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl -4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3.5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3.5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1 supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)benzotriazoles, for example 2-(2-hydroxy-5-methylphenyl)-benzotriazole, 2-(3,5-di-tert-butyl-2-hydroxyphenyl)benzotriazole, 2-(5-tert-butyl-2-hydroxyphenyl) benzotriazole, 2-(2-hydroxy-5-(1,1,3,3-tetramethylbutyl)phenyl)benzotriazole, 2-(3,5-di-tert-butyl-2-hydroxyphenyl)-5-chloro-benzotriazole, 2-(3-tert-butyl-2-hydroxy-5-methylphenyl)-5-chloro-benzotriazole, 2-(3-sec-butyl-5-tert-butyl-2-hydroxyphenyl)benzotriazole, 2-(2-hydroxy-4-octyloxyphenyl)benzotriazole, 2-(3,5-di-tert-amyl-2-hydroxyphenyl)benzotriazole, 2-(3,5-bis-(α,α-dimethylbenzyl)-2-hydroxyphenyl)benzotriazole, 2-(3-tert-butyl-2-hydroxy-5-(2-octyloxycarbonylethyl)phenyl)-5-chloro-benzotriazole, 2-(3-tert-butyl-5-[2-(2-ethylhexyloxy)-carbonylethl]-2-hydroxyphenyl)-5-chloro-benzotriazole, 2-(3-tert-butyl-2-hydroxy-5-(2-methoxycarbonylethyl)phenyl)-5-chloro-benzotriazole, 2-(3-tert-butyl-2-hydroxy-5-(2-methoxycarbonylethyl) phenyl)benzotriazole, 2-(3-tert-butyl-2-hydroxy-5-(2-octyloxycarbonylethyl)-phenyl) benzotriazole, 2-(3-tert-butyl-5-[2-(2-ethylhexyloxy)carbonylethyl]-2-hydroxyphenyl)benzotriazole, 2-(3-dodecyl-2-hydroxy-5-methylphenyl)benzotriazole, 2-(3-tert-butyl-2-hydroxy-5-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3-tert-butyl-5-(2-methoxycarbonylethyl)-2-hydroxyphenyl]-2H-benzotriazole with polyethylene glycol 300; [R—CH$_2$CH$_2$—COO—CH$_2$CH$_2$—]$_2$ where R=3'-tert-butyl-4'-hydroxy -5'-2H-benzotriazole-2-ylphenyl, 2-[2-[hydroxy-3-(α,α-dimethylbenzyl)-5-(1,1,3,3-tetramethylbutyl)-phenyl]benzotriazole; 2-[2-hydroxy-3-(1,1,3,3-tetramethylbutyl)-5-(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-α-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-amino -propylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 4,6-bis(2,4-dimethylphenyl)-2-[2-hydroxy-4-(2-hydroxy-3-nonyloxypropoxy)-5-(1-methyl-1-phenylethyl)phenyl]-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2] dioxaphosphocin, bis(2,4-di-tert-butyl-6-methylphenyl) methyl phosphite, bis(2,4-di-tert-butyl-6-methylphenyl)

ethyl phosphite, 2,2',2''-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-diyl)phosphite.

Especially preferred are the following phosphites:

Tris(2,4-di-tert-butylphenyl) phosphite (Irgafos®168, Ciba Specialty Chemicals Corp.), tris(nonylphenyl) phosphite,

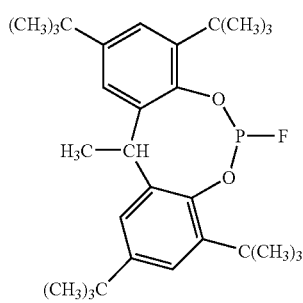

(6)

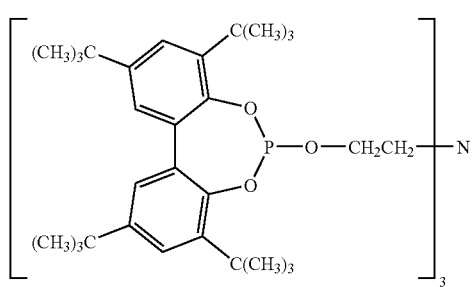

(7)

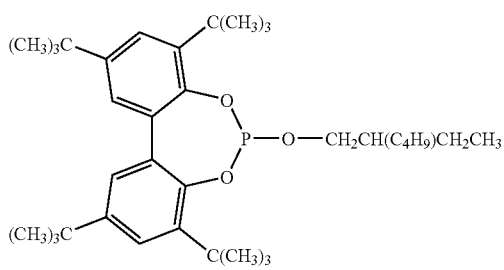

(8)

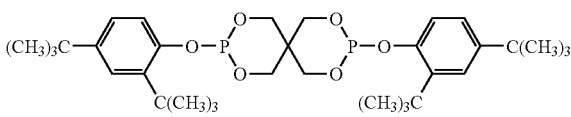

(9)

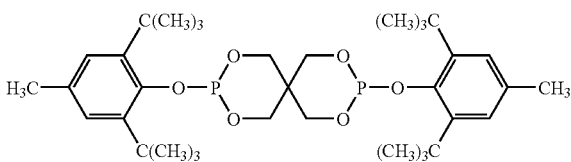

(10)

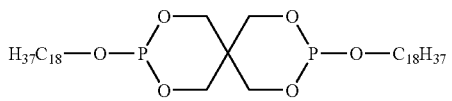

(11)

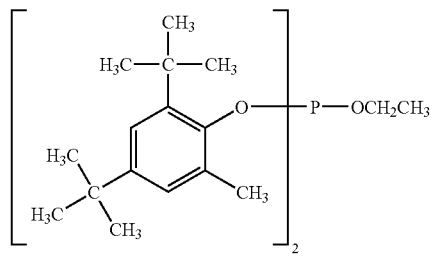

(12)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl) -5,7-di-tert-butyl-benzofuran-2-one, 3-(3, 5-dimethyl-4-pivaloyloxyphenyl)-5,7-di-tert-butyl-benzofuran -2-one, 3-(3,4-dimethylphenyl)-5,7-di-tert-butyl-benzofuran-2-one, 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

15. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifying agents and blowing agents.

The condensation polymer is advantageously present in the compositions of this invention from about 0.1 to about 20% by weight based on the total weight of components (a) and (b), preferably from about 0.5 to about 5% by weight.

The condensation polymer and optional further additives may be applied to or incorporated in the hydrophobic polymer by any known methods, e.g. by melt blending, solution blending, solution casting and adsorption from solution.

For example, the condensation polymer and optional further additives may be incorporated in the hydrophobic polymer before or after molding or also by applying the dissolved or dispersed additive mixture to the hydrophobic polymer, with or without subsequent evaporation of the solvent. The condensation polymer additive and optional further additives can also be added to the hydrophobic polymer in the form of a masterbatch which contains these components in a concentration of, for example, about 2.5% to about 25% by weight.

For example, the condensation polymer, optional further additives and the hydrophobic polymer may all be dissolved in a mutually compatible solvent wherein the concentration of polymer in the solvent ranges from about 5 to about 50% by weight of the solvent. The solution may then be dried at an appropriate temperature to produce a cast film containing a blend of polymer and the additive(s).

Alternatively, the condensation polymer and optional further additives are blended into the hydrophobic polymer by dissolving the condensation polymer and optional further additives in a volatile solvent to provide a solution with an overall concentration of condensation polymer and further additives of about 5 to about 50% by weight. The solution is then mixed with the hydrophobic polymer and the mixture is dried thereby providing polymer particles which are substantially evenly coated with additive(s). The coated polymer particles may then be fed to an extruder wherein the mixture is melt blended and extruded to produce an extrudate of the hydrophobic polymer containing the condensation polymer and optional further additive(s).

If in a liquid form, the condensation polymer may be applied directly to polymer particles by stirring the polymer particles in the liquid additive mixture until the additive mixture is evenly dispersed on the surface of the polymer particles. The polymer may then be fed to an extruder to produce an extrudate of the hydrophobic polymer containing the additives.

The compositions of this invention may also be prepared by submitting the condensation polymer optional further additives and solid hydrophobic polymeric material to an extruder followed by melt blending and extruding the molten mixture, for example, with a spinneret. Alternatively, the polymeric material and additives may be melt blended in a thermostatted vessel where the components are in molten form, followed by cooling of the mixture.

The condensation polymer is persistent in the hydrophobic polymer, and consequently the dyeability is substantially permanently improved.

The condensation polymer and optional further additives can also be added before or during the polymerization or before crosslinking of the hydrophobic polymer.

The condensation polymer and optional further additives can be incorporated into the hydrophobic polymer in pure form or encapsulated in waxes, oils or polymers.

The condensation polymer and optional further additives can also be sprayed or coated onto the hydrophobic polymer. It may be used to dilute other additives (for example the conventional additives indicated above) or their melts so that it can be sprayed or coated together with these additives onto the hydrophobic polymer. Addition by spraying during the deactivation of the polymerization catalysts is particularly advantageous, it being possible to carry out spraying using, for example, the steam used for deactivation.

In the case of spherically polymerized polyolefins it may, for example, be advantageous to apply the condensation polymer optionally together with other additives, by spraying.

In an interesting embodiment of the present invention, the condensation polymer is incorporated into the hydrophobic polymer by contacting the manufactured article comprising the hydrophobic polymer, such as a fiber, with an aqueous solution or dispersion of the condensation polymer, wherein the concentration of the condensation polymer is from about 0.1% to about 25% by weight, preferably from about 0.1% to about 10% by weight, based on the total weight of the aqueous solution or dispersion. Treatment of the manufactured article may be carried out before or simultaneously with the dyeing process, either by pretreating the article in a separate bath containing the condensation polymer or by adding the condensation polymer to the dye liquor. Preferably the condensation polymer is added to the dye liquor.

As the color imparting compounds there come into consideration dyes which are useful to dye hydrophobic polymer material, such as disperse dyes, acid dyes, etc., preferably disperse dyes.

Suitable acid dyes include, for example, the dyes described under "Acid Dyes" in the Colour Index, 3rd edition (3rd revision 1987 inclusive Additions and Amendments up to No. 85). The anionic dyes that can be used may belong to a wide variety of dye classes and may contain one or more sulfonic acid groups. They include, for example, triphenylmethane dyes having at least two sulfonic acid groups, heavy-metal-free monoazo and disazo dyes each having one or more sulfonic acid groups, and heavy-metal-containing, namely copper-, chromium-, nickel- or cobalt-containing, monoazo, disazo, azomethine and formazan dyes, especially metallised dyes, that contain two molecules of azo dye, or one molecule of azo dye and one molecule of azomethine dye, bonded to a metal atom, especially such dyes containing mono- and/or dis-azo dyes and/or azomethine dyes as ligands and a chromium or cobalt ion as central atom, as well as anthraquinone dyes, especially 1-amino-4-arylaminoanthraquinone-2-sulfonic acids and 1,4-diarylamino- or 1-cycloalkylamino-4-arylaminoanthraquinonesulfonic acids.

Suitable disperse dyes are those described under "Disperse Dyes" in the Colour Index, 3rd edition (3rd Revision 1987 including additions and amendments up to No. 85). Examples are carboxyl- and/or sulfo-free nitro, amino, amino ketone, ketone imine, methine, polymethine, diphenylamine, quinoline, benzimidazole, xanthene, oxazine or coumarin dyes, and especially anthraquinone dyes and azo dyes, such as monoazo or disazo dyes.

As the disperse dyes there come into consideration, for example, dyes of the formula

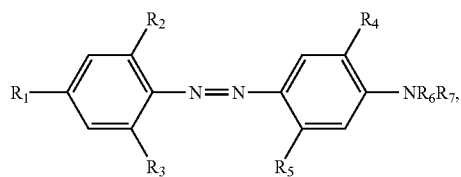
(13)

in which $R_1$ is halogen, nitro or cyano, $R_2$ is hydrogen, halogen, nitro or cyano, $R_3$ is hydrogen, halogen or cyano, $R_4$ is hydrogen, halogen, $C_1$-$C_4$alkyl or $C_1$-$C_4$alkoxy, $R_5$ is hydrogen, halogen or $C_2$-$C_4$alkanoylamino, and $R_6$ and $R_7$ independently of one another are hydrogen, allyl, $C_1$-$C_4$alkyl which is unsubstituted or substituted by hydroxy, cyano, $C_1$-$C_4$alkoxy, $C_1$-$C_4$alkoxy-$C_1$-$C_4$alkoxy, $C_2$-$C_4$alkanoyloxy, $C_1$-$C_4$alkoxycarbonyl, phenyl or phenoxy,

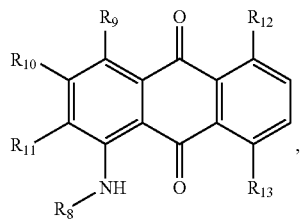
(14)

in which $R_8$ is hydrogen, $C_1$-$C_4$alkyl, phenyl or phenylsulfonyl, the benzene ring in phenyl and phenylsulfonyl being unsubstituted or substituted by $C_1$-$C_4$alkyl, sulfo or $C_1$-$C_4$alkylsulfonyloxy, $R_9$ is hydroxy, amino, N-mono- or N,N-di-$C_1$-$C_4$alkylamino, phenylamino, the benzene ring in phenyl being unsubstituted or substituted by $C_1$-$C_4$alkyl, $C_1$-$C_4$alkoxy, $C_2$-$C_4$alkanoylamino or halogen, $R_{10}$ is hydrogen, $C_1$-$C_4$alkoxy, halogen or cyano, $R_{11}$ is hydrogen, $C_1$-$C_4$alkoxy, halogen, phenoxy or the radical —O—$C_6H_5$—$SO_2$—NH—$(CH_2)_3$—O—$C_2H_5$, $R_{12}$ is hydrogen, hydroxy, amino or nitro, and $R_{13}$ is hydrogen, hydroxy, amino or nitro,

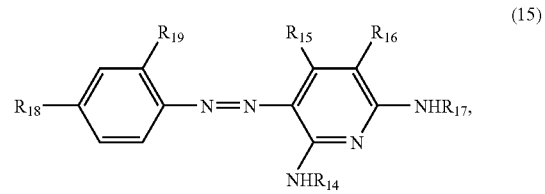
(15)

in which $R_{14}$ is $C_1$-$C_4$alkyl which is unsubstituted or substituted by hydroxy, $R_{15}$ is $C_1$-$C_4$alkyl, $R_{16}$ is cyano, $R_{17}$ is the radical of the formula —$(CH_2)_3$—O—$(CH_2)_2$—O—$C_6H_5$, $R_{18}$ is halogen, nitro or cyano, and $R_{19}$ is hydrogen, halogen, nitro or cyano,

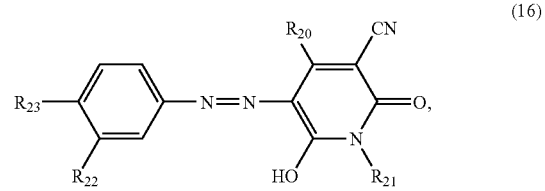
(16)

in which $R_{20}$ is $C_1$-$C_4$alkyl, $R_{21}$ is $C_1$-$C_4$alkyl which is unsubstituted or substituted by $C_1$-$C_4$alkoxy and $R_{22}$ is the radical —$COOCH_2CH_2OC_6H_5$ und $R_{23}$ is hydrogen or $R_{22}$ is hydrogen and $R_{23}$ is the radical —N═N—$C_6H_5$,

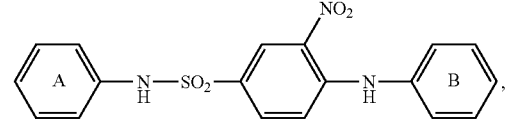
(17)

where the rings A and B are unsubstituted or substituted one or more times by halogen,

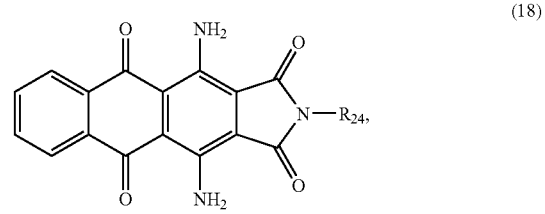
(18)

in which $R_{24}$ is $C_1$-$C_4$alkyl, which is unsubstituted or substituted by hydroxy, $C_1$-$C_4$alkoxy, $C_1$-$C_4$-alkoxy-$C_1$-$C_4$alkoxy, $C_2$-$C_4$alkanoyloxy or $C_1$-$C_4$alkoxycarbonyl, (19)

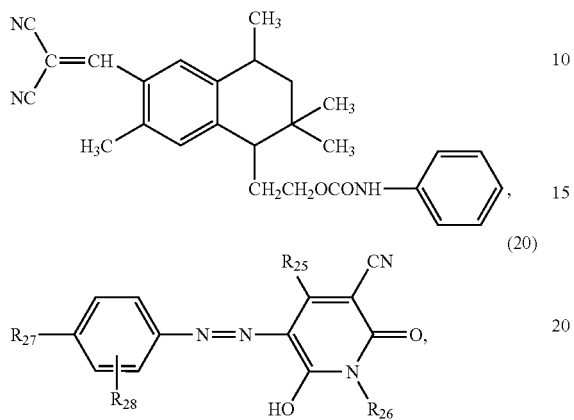

(20)

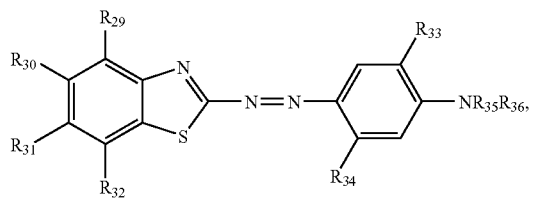

in which $R_{25}$ is $C_1$-$C_4$alkyl, $R_{26}$ is $C_1$-$C_4$alkyl, which is unsubstituted or substituted by $C_1$-$C_4$alkoxy, $R_{27}$ is hydrogen, $C_1$-$C_4$alkoxy or halogen, and $R_{28}$ is hydrogen, nitro, halogen or phenylsulfonyloxy, (21)

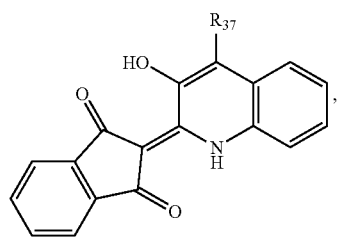

in which $R_{29}$, $R_{30}$, $R_{31}$ and $R_{32}$ independently of one another are hydrogen or halogen, $R_{33}$ is hydrogen, halogen, $C_1$-$C_4$alkyl or $C_1$-$C_4$alkoxy, $R_{34}$ is hydrogen, halogen or $C_2$-$C_4$alkanoylamino, and $R_{35}$ and $R_{36}$ independently of one another are hydrogen, $C_1$-$C_4$alkyl, which is unsubstituted or substituted by hydroxy, cyano, acetoxy or phenoxy, (22)

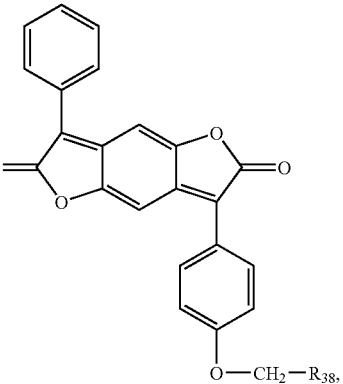

in which $R_{37}$ is hydrogen or halogen, (23)

in which $R_{38}$ is hydrogen, $C_1$-$C_4$alkyl, tetrahydrofuran-2-yl or $C_1$-$C_4$alkoxycarbonyl, which is unsubstituted or substituted in the alkyl by $C_1$-$C_4$alkoxy, (24)

in which $R_{39}$ is hydrogen or thiophenyl, which is unsubstituted or substituted in the phenyl by $C_1$-$C_4$-alkyl or $C_1$-$C_4$-alkoxy, $R_{40}$ is hydrogen, hydroxy or amino, $R_{41}$ is hydrogen, halogen, cyano or thiophenyl, which is unsubstituted or substituted in the phenyl by $C_1$-$C_4$alkyl or $C_1$-$C_4$-alkoxy, phenoxy or phenyl, and $R_{42}$ is phenyl, which is unsubstituted or substituted by halogen, $C_1$-$C_4$alkyl or $C_1$-$C_4$-alkoxy, (25)

in which $R_{43}$ is hydrogen or $C_1$-$C_4$alkyl, $R_{44}$ and $R_{45}$ independently of one another are hydrogen, halogen, nitro or cyano, $R_{46}$ is hydrogen, halogen, $C_1$-$C_4$alkyl or $C_1$-$C_4$alkoxy, $R_{47}$ is hydrogen, halogen or $C_2$-$C_4$alkanoylamino, and $R_{48}$ and $R_{49}$ independently of one another are hydrogen or $C_1$-$C_4$alkyl, which is unsubstituted or substituted by hydroxy, cyano, $C_1$-$C_4$alkoxy, $C_1$-$C_4$alkoxy-$C_1$-$C_4$alkoxy, $C_2$-$C_4$alkanoyloxy, $C_1$-$C_4$alkoxycarbonyl, phenyl or phenoxy.

As $C_1$-$C_4$alkyl radicals there come into consideration, for example, methyl, ethyl, n-propyl, isopropyl, n-butyl, sec-butyl, tert-butyl and isobutyl, preferably methyl and ethyl.

As $C_1$-$C_4$alkoxy radicals there come into consideration, for example, methoxy, ethoxy, n-propoxy, isopropoxy, n-butoxy, sec-butoxy, tert-butoxy and isobutoxy, preferably methoxy and ethoxy, and especially methoxy.

As halogen there come into consideration, for example, fluorine, chlorine, bromine and iodine, preferably chlorine and bromine.

As $C_2$-$C_4$alkanoylamino radicals there come into consideration, for example, acetylamino and propionylamino, especially acetylamino.

As $C_1$-$C_4$alkoxy-$C_1$-$C_4$alkoxy radicals there come into consideration, for example, methoxy-methoxy, methoxy-ethoxy, ethoxy-methoxy, ethoxy-ethoxy, ethoxy-n-propoxy, n-propoxy-methoxy, n-propoxy-ethoxy, ethoxy-n-butoxy and ethoxy-isopropoxy, preferably ethoxy-methoxy and ethoxy-ethoxy.

As N-mono- or N,N-di-$C_1$-$C_4$alkylamino radicals there come into consideration, for example, N-methylamino, N-ethylamino, N-propylamino, N-isopropylamino, N-butylamino, N-sec-butylamino, N-isobutylamino, N,N-dimethylamino and N,N-diethylamino, preferably N-isopropylamino.

As $C_2$-$C_4$alkanoyloxy radicals there come into consideration, for example, acetyloxy and propionyloxy, preferably acetyloxy.

As $C_1$-$C_4$alkoxycarbonyl radicals there come into consideration, for example, methoxycarbonyl, ethoxycarbonyl, n-propoxycarbonyl, isopropoxycarbonyl and n-butoxycarbonyl, preferably methoxycarbonyl and ethoxycarbonyl.

As $C_1$-$C_4$alkylsulfonyloxy radicals there come into consideration, for example, methylsulfonyloxy, ethylsulfonyloxy, n-propylsulfonyloxy, isopropylsulfonyloxy and n-butylsulfonyloxy, preferably methylsulfonyloxy and ethylsulfonyloxy.

The dyes are applied to the fiber materials by known dyeing methods. Preferably, the fibers are dyed from an aqueous solution or dispersion by the exhaust process, if required in the presence of customary anionic or nonionic dispersants, and in the presence of the condensation polymer in the temperature range from 80 to 140° C.

In the case of disperse dyes, it is expedient to convert these dyes, before use, into a dye formulation. This is done by milling the dyes to an average particle size of 0.1 to 10 microns. Milling can be carried out in the presence of dispersants. Typically, the dried dye is milled with a dispersant, or kneaded in paste form with a dispersant, and thereafter dried under vacuum or by spray drying.

The dyeing promoters are also suitable for dyeing fiber materials by the thermosol process and for printing, e.g. by rotary, flat-screen printing or ink-jet printing or indirectly by thermal transfer printing.

In the case of printing, the condensation polymer is advantageously incorporated into the fiber material during production of the fiber, by pretreatment of the fiber with an aqueous solution or dispersion containing the condensation polymer or by addition of the condensation polymer to the printing pastes or inks.

Customary thickeners may be used for printing, for example modified or nonmodified natural products, such as alginates, British gum, gum arabic, crystal gum, carob bean gum, tragacanth, carboxymethylcellulose, hydroxyethylcellulose, starch or synthetic products, including polyacrylamides, polyacrylic acid or copolymers thereof, or polyvinyl alcohols.

In addition to water and the dyes, the dye liquors or printing pastes can contain further auxiliaries, for example per se known shading dyes, salts, buffer substances, wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

The cited hydrophobic polymer articles, especially fiber materials, are dyed in level shades having very good end-use properties, in particular good fastness to light, thermomigration, pleating, chlorinating and good fastness to weat treatments, such as fastness to water, sweat and washing; and the dyeings are also distinguished by excellent fastness to rubbing.

The following Examples illustrate the invention in more detail. They are not to be construed as limiting the instant invention in any manner whatsoever. The invention is declared to cover all changes and modifications of the specific examples which do not constitute departure from the spirit and scope of the invention.

EXAMPLE 1

Preparation of the Condensation Polymer 120.7 g of 2,2-Bis(hydroxymethyl)propionic acid (BMPA, 0.90 mol), 2.50 g of dibutyltin oxide (0.01 mol), and 100.9 g of tetraglyme (0.45 mol) are added to a reaction flask equipped with a Dean Stark trap. The reaction mixture is heated to 205° C. and held at this temperature for 4 hours. The reaction mass is cooled to ambient temperature and a copious amount of heptane is added to remove the solvent. The heptane layer is decanted and the remaining resin is dissolved in a mixture of 300 g of methanol and 400 g of toluene. The methanol is distilled off under vacuum and toluene and residual tetraglyme are decanted off. The resin is extracted twice with 400 g of hot toluene (80° C.) with decantation of the toluene. The resin is dried under vacuum to constant weight. 110 g of the title compound is received as a white resinous solid having a molecular weight of 3254 as determined by Gel Permeation Chromatography (GPC).

EXAMPLE 2

Polypropylene Fiber Preparation

Fiber grade polypropylene, Montell PROFAX 6301, PEBAX MV 1074 (2.5 weight %, Atofina), and PLATAMID 1651 (2.5 weight %, Atofina) are mixed on a TURBULA mixer for 15 minutes. Also included is 0.5 weight % Tinuvin 327, 0.1 weight % Chimassorb 944, and 0.1 weight % Irgastab FS210. The mix is fed into a HILLS LAB FIBER EXTRUDER with a 41 hole round spinneret. The temperature profile of the extruder is at 400, 425, 450, 475, and 475° F. A constant pressure of 750 psi controls the screw speed via a feed back loop. The feed, draw, and relax rolls are at 175, 212 and 212° F., and are rotating at 120, 600 and 575 meters per minute. The draw ratio is 5:1 (600/120). The fiber comes in contact with a 6% aqueous fiber finish solution just before the feed roll. The fiber finish solution is LUROL PP-4521 from Goulston Industries. A LEESONA winder at the end of the line collects the fiber onto a spool. The final denier per filament is 10. The total denier for the yarn is 410 (41×10). The collected fiber is removed from the spool and is knitted into a sock with a LAWSON HEMPHILL FAK sampler knitter. Ten-gram samples are cut from the sock.

Dye Solution Preparation

Solutions of dyes are prepared by dissolving 1.0 g of the dye into 2 kg of distilled water. These solutions will serve as the dye master solutions. For disperse dyes, the water is heated to 145-185° F. and then the dye is added to the water.

Dye Auxiliary Solution Preparation

A dye auxiliary solution is made containing: buffer (ammonium sulfate 1.25 g/L), leveler (Ciba Tinegal ALS 0.625 g/L), lubricant (Cibafluid LA 1.875 g/L), and defoamer (Cibaflow SF 0.125 g/L). Acetic acid at a concentration of 10% (w/w) is used to adjust the pH to 4.5-5.5.

Polypropylene Fiber Dyeing

A ROACHES programmable dye bath is set to the following conditions: temperature rise of 2° C. per minute to 125° C. with a hold time of 60 minutes at 125° C. then a cool down at maximum cooling of 5.5° C. per minute.

40 g of the dye master solution, 160 g of the auxiliary solution, 10 g polypropylene sock prepared as described previously, and 1 g of the dyeing promoter are added to the Roaches steel 250 mL cylinder. The cylinder is sealed, placed into the dye bath, and the cycle/rotation is started. After the dye cycle is completed, the sock is removed from the cylinder and the dye solution is saved for analysis later for dye content. The sock is then rinsed with tap water. The excess water is removed from the sock via a centrifuge and is dried in a forced air oven at 212° F. for 15 minutes. The socks are then reduction-cleared to remove loose dye not fixed to the fiber. This is done by treating the dyed polypropylene sock for 20 minutes at 70° C. with 200 ml of the following solution: 5 cc/L 40% NaOH w/v, 2 g/L sodium hydrosulfite, and 1 g/L Cibapon OS. The sock is rinsed and dried as described previously.

The dye uptake is measured analytically by comparing the absorbance of the original dye solution against the solution obtained after dyeing.

The finished socks are folded twice and the K/S value is measured at the wavelength of minimum reflectance on a Datacolor Spectrophotometer SF600. Instrument conditions are: CIE lab, D65 illuminant, 10 degree observer, spectral component included (SCI), small area view (SAV), scanning wavelength=400-700 nm. A higher K/S value indicates improved dye uptake. K/S values are calculated by: K=absorption, S=scattering, R=the reflectance value at the minimum reflectance $$K/S=(1-R)^2/2R$$

The samples are weathered according to ASTM G26 in an Atlas Ci65A xenon arc weatherometer. The weatherometer (dry) conditions are: black panel temperature=63C, irradiance=0.35 W/m², wet bulb depression=14C, conditioning water=38C, cycle=continuous light, filters=borosilicate.

Color change or DE is calculated from the L, a, and b values, obtained from the CIE system from the reflectance values, using the equation given below:

$$[(\text{Delta } L)^2+(\text{Delta } a)^2+(\text{Delta } b)^2]^{1/2}=\text{Delta } E \ (DE)$$

EXAMPLE 3

Dyeing of Polypropylene Fiber

The polypropylene socks prepared in Example 2 are dyed with Terasil Blue 3RL according to the above dyeing procedure. The higher the percent dye uptake the more efficient the dyeing promoter is at promoting polypropylene dye uptake.

| Dyeing promoter | % Dye Uptake |
|---|---|
| Atmer 502 | 80 |
| Mesitylene | 87 |
| Example 1 | 99 |

Atmer 502 is a polyoxyethylene fatty ether.

This demonstrates that the Instant Compounds are excellent dyeing promoter for polypropylene fiber.

EXAMPLE 4

Dyeing of Polypropylene Fiber

The polypropylene socks prepared in Example 2 are dyed with Terasil Blue HLB according to the above dyeing procedure. The higher the percent dye uptake the more efficient the dyeing promoter is at promoting polypropylene dye uptake.

| Dyeing promoter | % Dye Uptake |
|---|---|
| Atmer 502 | 83 |
| Example 1 | 96 |

Atmer 502 is a polyoxyethylene fatty ether.

This demonstrates that the Instant Compounds are excellent dyeing promoters for polypropylene fiber.

EXAMPLE 5

Dyeing of Polypropylene Fiber

The polypropylene socks prepared in Example 2, with 0.5 weight % of $TiO_2$ added additionally, are dyed with Terasil Blue 3RL according to the above dyeing procedure. The higher the percent dye uptake the more efficient the dyeing promoter is at promoting polypropylene dye uptake.

| Dyeing promoter | % Dye Uptake |
|---|---|
| Atmer 502 | 81 |
| Example 1 | 94 |

Atmer 502 is a polyoxyethylene fatty ether.

This demonstrates that the Instant Compounds are excellent dyeing promoters for polypropylene fiber.

EXAMPLE 6

K/S Values for Dyed Polypropylene Fiber

The K/S values for the polypropylene socks prepared and dyed in Example 4 are measured. A higher K/S value indicates improved dye uptake.

| Dyeing promoter | K/S Value |
|---|---|
| Atmer 502 | 2.2 |
| Example 1 | 2.8 |

Atmer 502 is a polyoxyethylene fatty ether.

This demonstrates that the Instant Compounds are excellent dyeing promoters for polypropylene fiber as judged by the K/S values.

EXAMPLE 7

K/S Value for Dyed Polypropylene Fiber

The K/S values for the polypropylene socks prepared and dyed in Example 5 are measured. A higher K/S value indicates improved dye uptake.

| Dyeing promoter | K/S Value |
|---|---|
| Atmer 502 | 6.6 |
| Example 1 | 8.9 |

Atmer 502 is a polyoxyethylene fatty ether.

This demonstrates that the Instant Compounds are excellent dyeing promotors for polypropylene fiber as judged by the K/S values.

EXAMPLE 8

Xenon Weathering of Dyed Polypropylene Socks

The polypropylene socks prepared and dyed in Example 5 are subjected to accelerated Xenon weathering. After the indicated period of time, DE is measured according to the procedure described previously. The DE values represent the change in color after the indicated hours of exposure. A low DE value indicates less change in color and is highly desired.

| Dyeing promoter | DE after 80 hours |
|---|---|
| Mesitylene | 27 |
| Atmer 502 | 22 |
| Example 1 | 21 |

Atmer 502 is a polyoxyethylene fatty ether.

These data show that Example 1 does not adversely affect the weatherability of the dyed polypropylene socks.

What is claimed is:

1. A process for dyeing or printing an article comprising a hydrophobic polymer, wherein said polymer is brought into contact with a condensation polymer obtained by condensation of at least one poly-hydroxyl-mono-carboxylic acid, of the formula

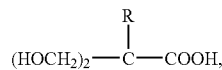

(1)

wherein
R is $C_1$-$C_{12}$alkyl or a radical—$CH_2$—OH, prior to or simultaneously with the treatment of said article with a color imparting compound, with the proviso that the condensation polymer is not terminated with lipophilic groups, and where the condensation polymer is a homopolymer.

2. A process according to claim 1, wherein R is $C_1$-$C_4$alkyl.

3. A process according to claim 1, wherein R is methyl.

4. A process according to claim 1, wherein the hydrophobic polymer is a polyolefin.

5. A process according to claim 1, wherein the hydrophobic polymer is polyethylene or polypropylene.

6. A process according to claim 1, wherein the color imparting compound comprises at least one disperse dyestuff.

7. A process according to claim 1, wherein the article is a fiber material.

8. A process according to claim 7, wherein the fiber material is dyed according to the exhaust dyeing method.

9. A process according to claim 7, wherein the condensation polymer is applied to the fiber material simultaneously with the color imparting compound.

* * * * *